3,141,891
BENZO-1,2-DITHIOLIUM COMPOUNDS
Erwin Klingsberg, Mountainside, N.J., assignor to American Cyanamid Company, Stamford, Conn., a corporation of Maine
No Drawing. Filed June 20, 1962, Ser. No. 203,724
3 Claims. (Cl. 260—327)

This application is a continuation-in-part of application Serial No. 27,254, filed May 6, 1960, now abandoned.

This invention relates to 4,5-benzo-1,2-dithiolium dyestuffs and a process for making them. More specifically, it relates to new dyestuffs of the formula:

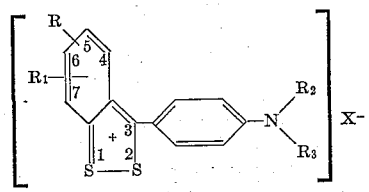

wherein each of the R and $R_1$ radicals is either hydrogen, chloro, bromo, fluoro, nitro, lower alkyl, or lower alkoxy; or together they represent a benzo ring; and each of the $R_2$ and $R_3$ radicals is lower alkyl, lower hydroxyalkyl, aryl, aralkyl, or lower cyanoalkyl. Aryl groups that are present may be monocyclic or bicyclic and may contain up to three lower alkyl, halo (e.g., chloro), nitro, or lower alkoxy groups. The anion $X^-$ may be derived from any acid, but acids that are not too weak (pKa not above 4) are preferable since they give stable salts.

These dyestuffs can be prepared by condensing a 4,5-benzo-1,2-dithiole-3-thione with a tertiary aniline in the presence of trichloromethanesulfenyl chloride or thiophosgene:

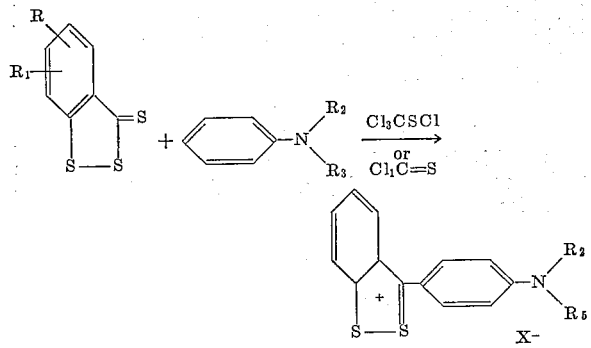

It is an advantage of this condensation reaction that it proceeds readily at room temperatures, but higher and lower temperatures, preferably in the range of $-10°$ C. to $35°$ C. may be employed.

If it is desired, an inert diluent, preferably an organic liquid which is a solvent for the trithione starting material, may be employed. This may be chosen from conventional solvents such as an aromatic hydrocarbon (e.g., toluene), a lower alkanol (e.g., ethanol), or chloroform. The thiophosgene or trichloromethanesulfenyl chloride may be mixed with the dithiolethione prior to addition of the tertiary aniline, instead of forming a mixture of all three components at once.

After reaction is complete, the product is converted to the desired salt by treatment with an inorganic or organic acid, e.g., perchloric, hydriodic, hydrobromic, fluoboric, or picric acid.

Tertiary anilines which may be employed include:

(1) Lower N,N-dialkylanilines such as N,N-dimethyl aniline, N,N-di-ethylaniline, N,N-di-butylaniline, N-ethyl-N-methylaniline and N-cyclohexyl-N-methyl aniline;
(2) N-lower alkyl-N-arylanilines such as N-methyldiphenylamine, N-ethyl-N-α-naphthylaniline, N-methyl-N-p-tolylaniline, N-propyl-p-methoxydiphenylamine, and N-butyl-p-chlorodiphenylamine;
(3) N-β-cyanoethyl-N-methylaniline;
(4) N-β-hydroxyethyl-N-methylaniline; and
(5) N-methyl-N-benzylaniline.

Among the 4,5-benzodithiolethiones which may be employed are the following:

(1) 6-chlorobenzo-1,2-dithiole-3-thione,
(2) 6,7-dimethylbenzo-1,2-dithiole-3-thione,
(3) 6-nitrobenzo-1,2-dithiole-3-thione,
(4) 5,6-dimethoxybenzo-1,2-dithiole-3-thione,
(5) 6-fluorobenzo-1,2-dithiole-3-thione,
(6) Naphtho[2,3-c]1,2-dithiole-3-thione, and
(7) Naphtho[1,2-c]1,2-dithiole-3-thione.

As a class, benzodithiolethiones are known to be available by a variety of reactions, including the action of $P_2S_5$ on an o-mercapto aromatic carboxylic acid (e.g., thiosalicyclic acid) or the corresponding disulfide (e.g., 2,2'-dithiodibenzoic acid). When desired or convenient, any benzodithiolethione not readily available from another source, may be obtained by the use of one of the foregoing preparatory methods.

Compounds of the present invention may be used in the customary manner as dyestuffs for textiles. Thus, they impart intense shades to acrylic fibers.

The following examples, in which parts are by weight, unless otherwise noted, and degree are in centigrade, are presented to further illustrate the present invention.

Example 1

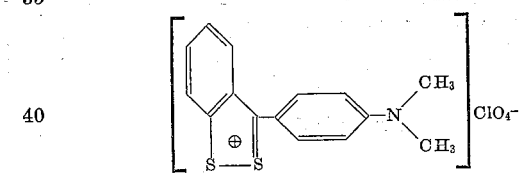

Three parts by volume of trichloromethanesulfenyl chloride are added to a solution of 5.0 parts of 4,5-benzo-1,2-dithiole-3-thione in 50 parts (by volume) of toluene. After completion of the reaction, the product is filtered, washed with benzene, and added to a solution of 3.0 parts by volume of dimethylaniline in 50 parts by volume of ethanol. On addition of perchloric acid, the deep blue product separates as the perchlorate salt, which is recrystallized from methanol. It gives bright blue dyeings on polyacrylonitrile fibers.

When N - methyl - N - butylaniline, N-cyclohexyl-N-methylaniline and N,N-dibutylaniline are substituted in the foregoing procedure, the corresponding 4,5-benzo-3-tertiary aminophenyl-1,2-dithiolium derivatives are obtained.

Example 2

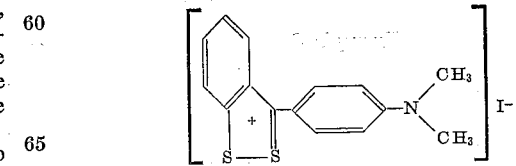

1.84 parts of 4,5-benzo-1,2-dithiole-3-thione and 1.26 parts of dimethylaniline are dissolved in 50 parts by volume of pyridine, and chilled in an ice bath. 1.9 parts of trichloromethanesulfenyl chloride are added with stirring. The product is filtered, dissolved in propanol, and treated with HI to give the iodide, which may be crystallized from methanol. It dyes polyacrylonitrile bright blue shades.

Example 3

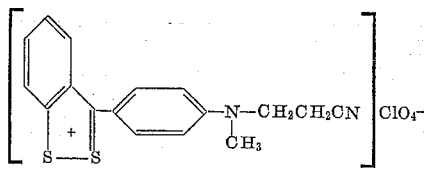

This product is made by the procedure of Example 1, replacing the dimethylaniline by an equivalent amount of N-methyl-N-cyanoethylaniline. It gives a redder blue dyeing on polyacrylonitrile than is obtained with the product of Example 2.

Example 4

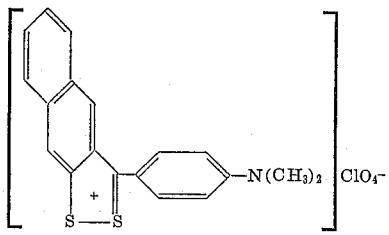

This product is made by the procedure of Example 1, replacing the benzo-1,2-dithiole-3-thione by an equivalent of naphtho[2,3-C]-1,2-dithiole-3-thione. The product gives blue dyeings on polyacrylonitrile.

Example 5

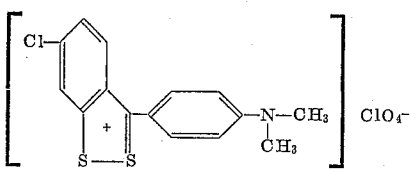

This product is made by the procedure of Example 1, using an equivalent amount of 6-chloro-benzo-1,2-dithiole-3-thione. It gives bright blue dyeings on polyacrylonitrile fibers.

Example 6

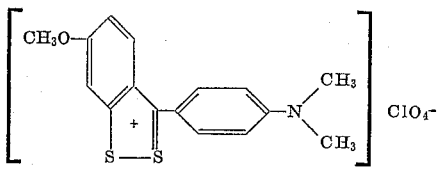

This product is prepared by the procedure of Example 1, using 6-methoxy-benzo-1,2-dithiole-3-thione in place of the thione used therein.

Example 7

A solution of 1.84 parts of 4,5-benzo-1,2-dithiole-3-thione and 1.15 parts of thiophosgene in 50 parts by volume of chloroform is stirred overnight. After the addition of 1.26 parts of dimethylaniline, the mixture is again stirred overnight. Digestion with dilute HCl followed by perchloric acid gives the blue dyestuff of Example 1.

Example 8

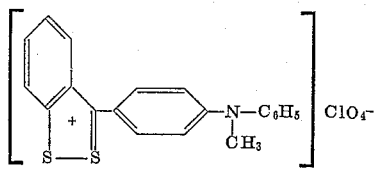

This product is prepared by the procedure of Example 1, using N-methyldiphenylamine instead of dimethylaniline. It gives blue dyeings on polyacrylonitrile.

I claim:

1. A compound of the formula:

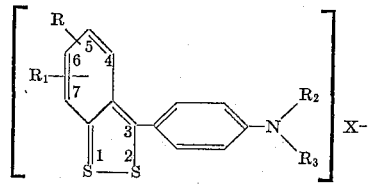

wherein R and $R_1$ are selected from the group consisting of hydrogen, chloro, bromo, fluoro, nitro, lower alkyl, lower alkoxy, and together benzo; $R_2$ and $R_3$ are individually selected from the group consisting of lower alkyl, $\beta$-hydroxyethyl, phenyl, naphthyl, phenyl lower alkyl and $\beta$-cyanoethyl; said phenyl, naphthyl and benzo moieties containing up to three substituents selected from the group consisting of lower alkyl, halo, nitro and lower alkoxy; and X is an anion of an acid of pKa not above 4.

2. A compound of claim 1 wherein the anion is selected from the group consisting of perchlorate, iodide, bromide, fluoborate and picrate.

3. A process of preparing the compound of the formula:

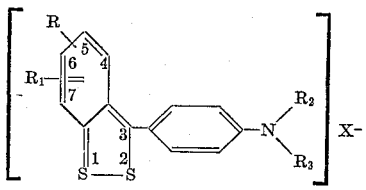

wherein R and $R_1$ are selected from the group consisting of hydrogen, chloro, bromo, fluoro, nitro, lower alkyl, lower alkoxy, and together benzo; $R_2$ and $R_3$ are individually selected from the group consisting of lower alkyl, $\beta$-hydroxyethyl, phenyl, naphthyl, phenyl lower alkyl and $\beta$-cyanoethyl; said phenyl, naphthyl and benzo moieties containing up to three substituents selected from the group consisting of lower alkyl, halo, nitro and lower alkoxy; and X is an anion of an acid of pKa not above 4; which comprises reacting a benzodithiolethione of the formula:

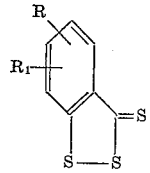

wherein R and $R_1$ are as above-defined, with an aniline compound of the formula:

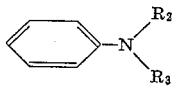

wherein $R_2$ and $R_3$ are as defined above, in the presence of a catalyst selected from the group consisting of trichloromethanesulfenyl chloride and thiophosgene; and separating the product thus formed.

No references cited.

UNITED STATES PATENT OFFICE
CERTIFICATE OF CORRECTION

Patent No. 3,141,891                                  July 21, 1964

Erwin Klingsberg

It is hereby certified that error appears in the above numbered patent requiring correction and that the said Letters Patent should read as corrected below.

Column 1, lines 37 to 51, for that portion of the formula reading:

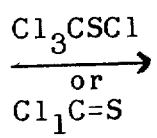      read      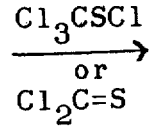

same column 1, lines 37 to 51, for the lower right-hand portion of the formula reading:

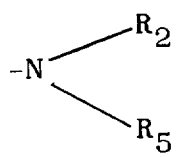      read      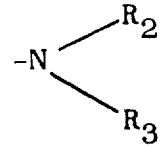

line 71, for "N,N-dimethyl" read -- N,N-dimethyl- --; column 2, line 1, for "-N-methyl" read -- -N-methyl- --; line 32, for "degree are in centigrade" read -- degrees are in Centigrade --.

Signed and sealed this 24th day of November 1964.

(SEAL)
Attest:

ERNEST W. SWIDER                              EDWARD J. BRENNER
Attesting Officer                               Commissioner of Patents